F. W. REEVES.
CURRENT RECTIFYING COMMUTATOR.
APPLICATION FILED AUG. 23, 1917.

1,275,601.

Patented Aug. 13, 1918.

WITNESSES
W T Nuttall
C. L. Lewis

INVENTOR,
Frederick W. Reeves,
BY Richard S. Harrison,
his Attorney.

UNITED STATES PATENT OFFICE.

FREDERICK W. REEVES, OF PITTSBURGH, PENNSYLVANIA.

CURRENT-RECTIFYING COMMUTATOR.

1,275,601.   Specification of Letters Patent.   Patented Aug. 13, 1918.

Application filed August 23, 1917. Serial No. 187,898.

*To all whom it may concern:*

Be it known that I, FREDERICK W. REEVES, a citizen of the United States, residing at Pittsburgh, in the county of Allegheny and State of Pennsylvania, have invented new and useful Improvements in Current-Rectifying Commutators, of which the following is a specification.

My invention relates in particular to commutators of the bar type, and has for its principal object to provide a simple and practical means whereby the assembled bars are interlocking to prevent displacement of one or more of the bars, due to expansion or to centrifugal force, thereby preventing irregularity in its working surface.

With the above object in view, the invention consists in certain features of construction, and in certain parts and their arrangement, as will be hereinafter more fully set forth and particularly pointed out in the appended claims.

In the accompanying drawings I have shown one embodiment of my invention, in which—

Figure 1:
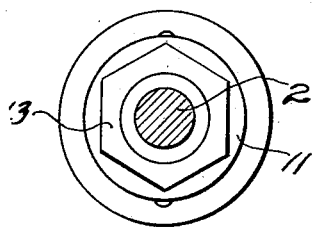
Figure 1 is an end elevation of my improved rectifying commutator.
Figure 2:
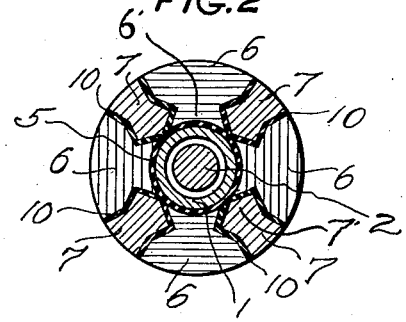
Fig. 2 is an end elevation of the same, in section.
Figure 3:
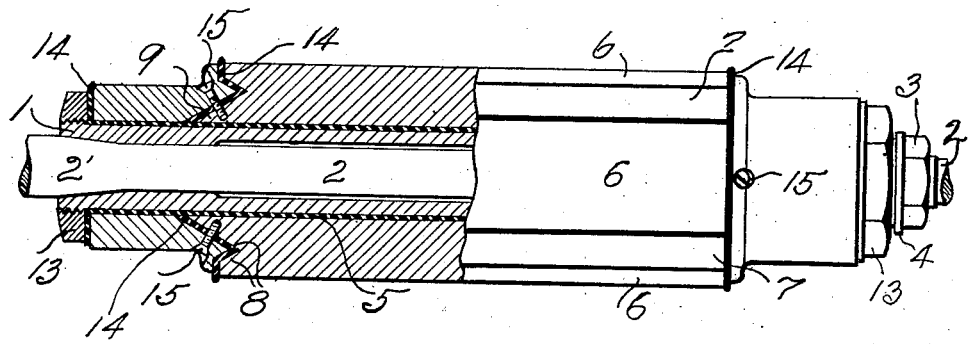
Fig. 3 is a plan thereof in partly longitudinal section.

The construction shown comprises a supporting sleeve, 1, adapted to neatly fit over the shaft, 2, the bore thereof being tapered at one end to correspond with the tapered portion, 2', of the shaft. In this instance the sleeve is secured to the shaft by being jammed tightly on the tapered portion thereof by means of the nut, 3, carried by the shaft, there being a soft washer, 4, interposed between the nut and sleeve end.

This sleeve, 1, has fitted thereover a second sleeve, 5, of insulating material and upon which the current rectifier parts or members are assembled. These members comprise a plurality of circumferentially spaced active segments or commutator bars, 6, there being, in this particular embodiment, alternately disposed inactive or dead bars, 7, of less breadth, but it is to be understood that the improvement also applies to structures where all bars are of like breadth and active. These bars are all of equal length, each having both ends provided with a tapered transversely-disposed V shaped groove, 8, and terminates at its base in a tapered extension, 9, all of said bars being separated by insulations, 10.

The collecting rings, 11, are disposed one at each end of the commutator the inner end of each being tapered to correspond to that of the V groove adjacent end of the commutator, with insulation, 12, therebetween. These collector rings are jammed up tightly in place, so as to secure the bars in position, by nuts, 13, on the ends of the supporting sleeve, there being insulating material, 14, therebetween. The two opposite commutator bars in this instance are connected to one of the collector rings, so as to form a unitary contact, by screws, 15, the two other opposed commutator bars being like connected to the other collecting ring by like screws, 15, so as to bring about the desired alternate relation.

To overcome any difference of expansion, due to that occasioned by the friction of the brushes on the commutator bars, during service, and the normal condition of the supporting sleeve, in particular as well as the centrifugal force which tends to bulge or distort the bars at the middle, when of extreme length, said bars are made interlocking longitudinally. This interlocking is accomplished by forming the dovetailed portion, 6', longitudinally of the base of the bars, 6, and the correspondingly formed interlocking dovetailed base portion, 7', longitudinally of the alternate bars, 7.

The insulation, 10, interposed between the bars, as shown, corresponds in form to and closely engages the locking faces of which it forms a part.

By this locking construction it will be readily apparent that any tendency of the commutator bars to become displaced by either expansion or centrifugal force will be effectually prevented.

What I claim and desire to secure by Letters Patent is:

1. The combination with a shaft having a tapered shoulder formed thereon, of a supporting sleeve engaging over said shaft and provided with a correspondingly tapered end to engage over the shaft shoulder, a plurality of longitudinally interlocking commutator bars disposed about said sleeve in cylindrical form the ends thereof being provided with a groove, a pair of rings, disposed one on each end of said sleeve, the inner face of each being provided with a tapered portion corresponding to and engaging within the commutator bar ends, means carried by each end of said sleeve to forcibly retain said rings against said commutator ends, and means carried by the shaft to secure said sleeve to said shaft.

2. The combination with a shaft having a tapered shoulder formed thereon, of a supporting sleeve engaging over said shaft and provided with a correspondingly tapered end to engage over the shaft shoulder, a plurality of longitudinally interlocking commutator bars disposed about said sleeve in cylindrical form the ends thereof being provided with a groove, a pair of collector rings, disposed one on each end of said sleeve, the inner face of each being provided with a tapered portion corresponding to and engaging within the commutator bar ends, every other one of said commutator bars being connected at one end to one of said rings and the remaining bars to the other rings, means carried by each end of the sleeve to forcibly retain said rings against said commutator ends, and means carried by the shaft to secure said sleeve to said shaft.

3. The combination with a shaft having a tapered shoulder formed thereon, of a supporting sleeve engaging over said shaft and provided with a correspondingly tapered end to engage over the shaft shoulder, a plurality of longitudinally interlocking, alternative live and dead commutator bars disposed about said sleeve in cylindrical form the ends thereof being provided with a groove, a pair of collector rings, disposed one on each end of said sleeve, the inner face of each being provided with a tapered portion corresponding to and engaging within the commutator bar ends, every other one of said live commutator bars being connected at one end to one of said rings and the remaining bars to the other rings, means carried by each end of the sleeve to forcibly retain said rings against said commutator ends, and means carried by the shaft to secure said sleeve to said shaft.

In testimony whereof, I have hereunto signed my name in the presence of two witnesses.

FREDERICK W. REEVES.

Witnesses:
R. S. HARRISON,
GEO. R. CAIN.

Copies of this patent may be obtained for five cents each, by addressing the "Commissioner of Patents, Washington, D. C."